United States Patent [19]

Månsson

[11] Patent Number: 5,147,599
[45] Date of Patent: Sep. 15, 1992

[54] FUEL ASSEMBLY OF A NUCLEAR REACTOR

[75] Inventor: Ragnar Månsson, Västerås, Sweden

[73] Assignee: ABB Atom AB, Västerås, Sweden

[21] Appl. No.: 665,317

[22] Filed: Mar. 6, 1991

[30] Foreign Application Priority Data

Mar. 9, 1990 [SE] Sweden ................................ 9000849

[51] Int. Cl.$^5$ ................................................ G21C 3/32
[52] U.S. Cl. ........................................ 376/446; 376/449; 376/441
[58] Field of Search ............... 376/446, 449, 441, 442, 376/440; 976/DIG. 65, DIG. 68

[56] References Cited

U.S. PATENT DOCUMENTS

| | | | |
|---|---|---|---|
| 3,864,211 | 2/1975 | King et al. | 376/440 |
| 4,064,004 | 12/1977 | Long et al. | 376/440 |
| 4,699,759 | 10/1987 | Feild, Jr. | 376/446 |

*Primary Examiner*—Brooks H. Hunt
*Assistant Examiner*—Meena Chelliah
*Attorney, Agent, or Firm*—Watson, Cole, Grindle & Watson

[57] ABSTRACT

A fuel assembly for a nuclear reactor with a number of parallel fuel rods which are retained by means of spacer lattices and guide tubes (3), which guide tubes (3) are also fixed to the spacer lattices, a top tie plate (4) and a bottom tie plate between which the guide tubes (3) with associated fuel rods are fixed. The top tie plate (4) has been provided with through-holes (10) for connection to a top sleeve (7) joined to the upper end surface of the respective guide tube (3). According to the invention, there is arranged inside the top sleeve (7) a first locking element (9) for cooperation with a second locking element (13). This is arranged on a guide sleeve (11) which is insertable through a hole (10) in the top tie plate (4), which hole corresponds to the respective top sleeve (7).

7 Claims, 2 Drawing Sheets

FUEL ASSEMBLY OF A NUCLEAR REACTOR

BACKGROUND OF THE INVENTION

The present invention relates to a fuel assembly for a nuclear reactor with a detachable top tie plate to make possible reconditioning of the fuel assembly.

A fuel assembly of a known design comprises a plurality of fuel rods and guide tubes for control rods or arranged as water tubes only in certain, special nuclear reactors, the fuel rods and guide tubes being kept in predetermined mutual positions by means of spacer lattices placed along the fuel assembly. The top tie plate and the bottom tie plate at the ends of the fuel assembly are fixed to the guide tubes of the control rods, which guide tubes extend somewhat above and below the ends of the fuel rods. In this known fuel assembly the guide tubes are provided on top with a top sleeve which fits into a corresponding hole through the top tie plate. A peripheral slot is arranged in the hole, a bead around the upper part of the top sleeve fitting into this slot. The top sleeve is provided with an axial slit, extending from its upper end through the bead and made of a resilient material The slit permits the upper end of the top sleeve to be squeezed together so that the top sleeve can be moved in the hole of the top tie plate to a position in which the bead falls into the slot, whereupon the end is allowed to rebound. To ensure the locking between the top sleeve and the top tie plate, a locking sleeve is inserted into the top sleeve, which locking sleeve prevents the bead from leaving the slot. A drawback of this design is that a rather extensive machining of the top tie plate must be performed, such as, for example, milling of slots in the holes. Further, when mounting the top tie plate, all top sleeves must be squeezed together more or less simultaneously in order for the top tie plate to be fitted onto the top sleeve. Accordingly, this mounting may become quite problematic.

SUMMARY OF THE INVENTION

The present invention avoids the above-mentioned drawbacks. As usual, the fuel assemby comprises a number of parallel fuel rods which are retained by means of spacer lattices, arranged along the fuel rods, as well as guide tubes for control rods or arranged only as water tubes in certain, special nuclear reactors. The guide tubes are arranged between the fuel rods and fixed to the spacer lattices. The guide tubes and the associated fuel rods have been fixed between a top tie plate and a bottom tie plate. The top tie plate has been provided with a through-hole for connection of a top sleeve joined to the upper end of the guide tubes.

According to the invention, there is arranged inside the top sleeve a first locking element intended to cooperate with a second locking element arranged on a guide sleeve, which is insertable through a hole in the top tie plate, which hole corresponds to the top sleeve.

By the invention, extra machining of the top tie plate is avoided since now the second locking element is arranged in a separate guide sleeve. Further, the fixing of the top sleeves of the guide tubes may take place individually as the guide sleeves are inserted, one by one, through the holes in the top tie plate.

An additional improvement of the invention is obtained if seats for the top sleeves are arranged around the holes, into which seats the top sleeves can be easily guided and fixed, one by one, to the top tie plate by means of guide sleeves.

BRIEF DESCRIPTION OF THE DRAWINGS

The invention will be most readily understood with reference to the accompanying FIGS. 1-6, wherein FIG. 1 schematically shows a fuel assembly

DETAILED DESCRIPTION OF THE PREFERRED EMBODIMENT

Figure 1:
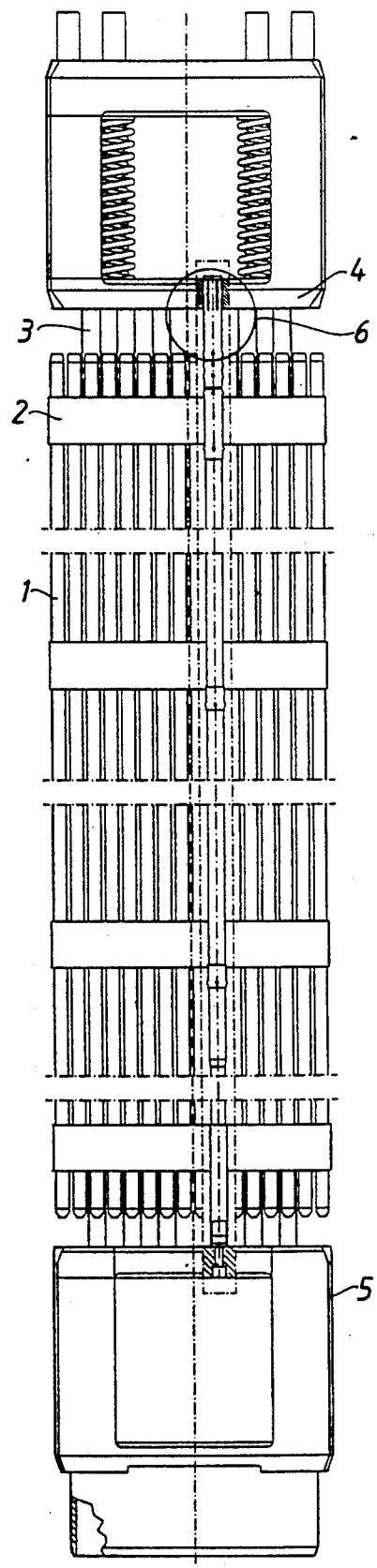

In FIG. 1, 1 designates the fuel assembly, which is composed of a large number of long fuel rods retained by spacer lattices 2. Between the fuel rods 1 there are arranged guide tubes 3, which are also kept in predetermined positions by the spacer lattices 2. The guide tubes 3, which are somewhat longer than the fuel rods 1 and extend somewhat above and below the ends of the fuel rods, are fixed to the top tie plate 4 and the bottom tie plate 5. The detail 6, which shows the upper part of the attachment of a guide tube 3 to the top tie plate 4, is shown enlarged in FIG. 2.

Figure 2:
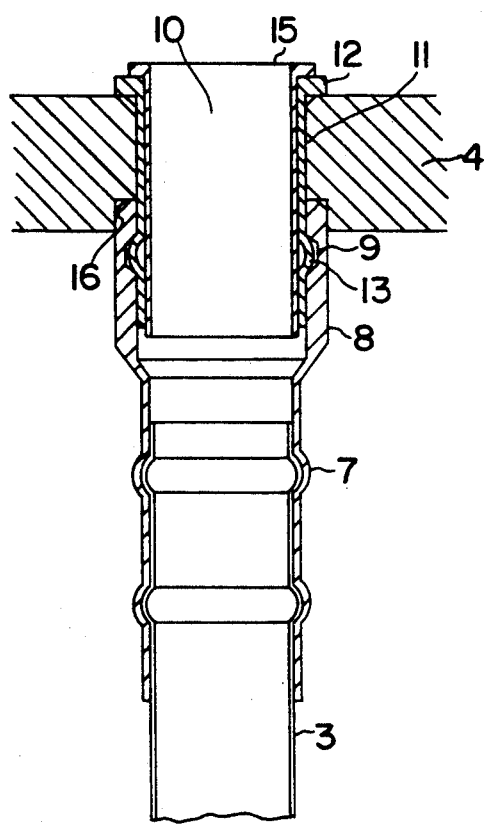
FIG. 2 is an enlargement of detail 6 in FIG. 1.
Figure 6:
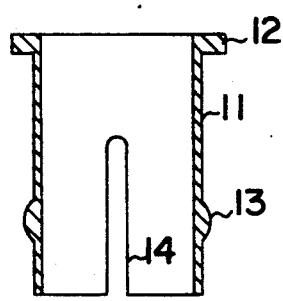
FIG. 6 shows an alternative embodiment of the guide sleeve.

In FIG. 2, the upper end of the guide tube 3 is joined to a top sleeve 7 by means of a number of beads. The upper end 8 of the top sleeve 7 is somewhat reinforced and inside of this part a peripheral slot 9 is arranged. This corresponds to the previously mentioned first locking element. Through the top tie plate 4 a hole 10 is provided. Through this hole there is inserted from above a guide sleeve 11 provided with a flange 12. This guide sleeve 11 is provided with a bead 13 surrounding the sleeve 11, this bead 13 constituting the mentioned second locking element. The bead 13 is to fit into the slot 9. The guide sleeve 11 is also provided with a slit 14 (see FIG. 4). A locking sleeve 15 is inserted into the guide sleeve 11. Further, a seat 16 for the top sleeve 7 is bored in the top tie plate 4. In FIG. 6 the bead 13 of the guide sleeve has been filled up.

Figure 5:
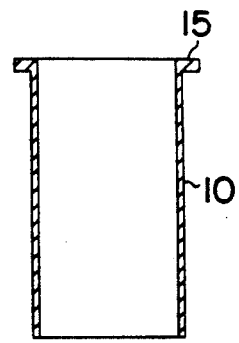
Figure 4:
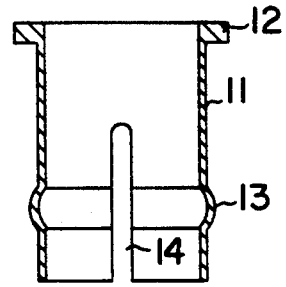
Figure 3:
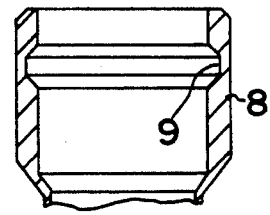
FIG. 3 shows a cross-section of the upper part of a top sleeve, FIG. 4 of a guide sleeve and FIG. 5 of an associated locking sleeve.

FIG. 3 shows the upper part 8 of the top sleeve 7 with the slot 9. FIG. 4 shows the guide sleeve with the slit 14 and FIG. 5 the locking sleeve 15.

The mounting operation is carried out such that the top tie plate 4 is placed on the guide tubes 3 so that the upper ends 8 of the top sleeves 7 are guided into the seats 16.

Then a guide sleeve 11 is pressed down through the hole 9, whereupon the guide sleeve, because of the slit 14, rebounds so that it enters the hole in spite of the bead 13. It is pressed in so far that the bead falls down into the slot 9, the guide sleeve 11 and the top sleeve 7 thus being locked to each other. The length of the guide sleeve 11 is then adapted such that, at the very moment when the bead 13 falls down into the slot 9, the flange 12 impinges against the upper part of the top tie plate 4. In this way a stable locking of the top tie plate 4 to the guide tubes 3 is achieved. To prevent the bead 13 from being pulled out of the slot 9, a locking sleeve 15 is then inserted into the guide sleeve 11. In this way the first locking element, the slot 9, is interlocked to the second locking element, the bead 13. To ensure that also the locking sleeve 15 is not detached, it can be secured by a swelling (not shown) over the bead 13 or below the sleeve 11 in those cases where the bead 13 according to FIG. 6 is not filled.

It would, of course, be possible to have other forms of locking elements between the top sleeve and the guide sleeve, such as, for example, different forms of resilient hooks or the like.

When the top tie plate is to be removed, first the locking sleeves 15 and then the guide sleeves 11 are removed. Thereafter, the top tie plate 4 rests completely freely on the top sleeves 7 of the guide tubes 3.

I claim:

1. A fuel assembly for a nuclear reactor which comprises a top tie plate which has a top surface, a bottom surface and a hole which extends therethrough from said top surface to said bottom surface, a bottom tie plate, a plurality of parallel fuel rods which extend between said top tie plate and said bottom tie plate, a plurality of spacer lattices positioned along said fuel rods, a plurality of guide tubes located between said fuel rods, said guide tubes being fixed to said spacer lattices, a seat in said top tie plate around said hole, a top sleeve which defines a lower end to which an upper end of a guide tube can be joined and an upper end which abuts said seat, a first locking means inside said top sleeve, a guide sleeve which is positionable through said hole in said top tie plate and into said top sleeve, and a second locking means on the outside of said guide sleeve which is cooperable with said first locking means to connect said guide sleeve and said top sleeve together.

2. A fuel assembly according to claim 1, wherein said hole through said top tie plate has a first part which extends from said top surface towards said bottom surface and a second part which extends from said first part to said bottom surface, said second part having a larger diameter than said first part, said diameter of said second part corresponding to an outer diameter of the upper end of said top sleeve and providing said seat.

3. A fuel assembly according to claim 1, wherein said first locking means comprises an inner slot which extends around a circumference of said top sleeve.

4. A full assembly according to claim 3, wherein said second locking means comprises an external bead which extends around the periphery of said guide sleeve, said bead being positionable in said inner slot of said top sleeve, and wherein said guide sleeve includes an axial slit to enable said bead to be positioned within said inner slot.

5. A fuel assembly according to claim 1, wherein said guide sleeve includes a flange that abuts said top surface of said top tie plate.

6. A fuel assembly according to claim 1, including a locking sleeve which is positionable within said guide sleeve to interlock said guide sleeve to said top sleeve.

7. A fuel assembly according to claim 6, wherein said locking sleeve is provided with a swelling which fits the indentation formed inside the guide sleeve on the back of its external bead or below the end of the guide sleeve.

* * * * *